US 11,379,996 B2

(12) United States Patent
Kaufmann et al.

(10) Patent No.: US 11,379,996 B2
(45) Date of Patent: Jul. 5, 2022

(54) DEFORMABLE OBJECT TRACKING

(71) Applicant: APPLE INC., Cupertino, CA (US)

(72) Inventors: Peter Kaufmann, Zurich (CH); Daniel Kurz, Sunnyvale, CA (US); Brian Amberg, Zollikon (CH); Yanghai Tsin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/761,582

(22) PCT Filed: Nov. 13, 2018

(86) PCT No.: PCT/US2018/060592
§ 371 (c)(1),
(2) Date: May 5, 2020

(87) PCT Pub. No.: WO2019/099337
PCT Pub. Date: May 23, 2019

(65) Prior Publication Data
US 2020/0273180 A1 Aug. 27, 2020

Related U.S. Application Data

(60) Provisional application No. 62/586,139, filed on Nov. 14, 2017, provisional application No. 62/623,784, filed on Jan. 30, 2018.

(51) Int. Cl.
*G06T 7/246* (2017.01)
*G06T 7/55* (2017.01)
(Continued)

(52) U.S. Cl.
CPC ............ *G06T 7/248* (2017.01); *G06T 7/251* (2017.01); *G06T 7/292* (2017.01); *G06T 7/55* (2017.01);
(Continued)

(58) Field of Classification Search
None
See application file for complete search history.

(56) References Cited

U.S. PATENT DOCUMENTS 6,396,496 B1 * 5/2002 Pfister ................ G06T 13/20
345/420
10,783,690 B2 * 9/2020 Sagar .................. G06T 13/00
(Continued)

FOREIGN PATENT DOCUMENTS

KR  10-2016-0128030   11/2016
KR  10-2017-0015306   2/2017
KR  10-2017-0063643   6/2017

OTHER PUBLICATIONS

PCT, European Patent Office (ISA/EP), International Search Report and Written Opinion of the International Searching Authority, International Application No. PCT/US2018/060592, 13 pages (Feb. 1, 2019).
(Continued)

*Primary Examiner* — James A Thompson
(74) *Attorney, Agent, or Firm* — Thompson Hine LLP

(57) ABSTRACT

Various implementations disclosed herein include devices, systems, and methods that use event camera data to track deformable objects such as faces, hands, and other body parts. One exemplary implementation involves receiving a stream of pixel events output by an event camera. The device tracks the deformable object using this data. Various implementations do so by generating a dynamic representation of the object and modifying the dynamic representation of the object in response to obtaining additional pixel events output by the event camera. In some implementations, generating the dynamic representation of the object involves identifying features disposed on the deformable surface of the object using the stream of pixel events. The features are determined by identifying patterns of pixel events. As new event stream
(Continued)

data is received, the patterns of pixel events are recognized in the new data and used to modify the dynamic representation of the object.

29 Claims, 8 Drawing Sheets

(51) Int. Cl.
 *G06T 7/292* (2017.01)
 *G06T 7/73* (2017.01)
 *G06T 17/00* (2006.01)

(52) U.S. Cl.
 CPC .............. *G06T 7/74* (2017.01); *G06T 17/00* (2013.01); *G06T 2207/20081* (2013.01); *G06T 2207/20084* (2013.01)

(56) References Cited

U.S. PATENT DOCUMENTS

| | | | | |
|---|---|---|---|---|
| 11,010,910 | B2* | 5/2021 | Harmsen | G06T 7/579 |
| 2013/0055830 | A1* | 3/2013 | Metcalf | G06F 3/014 |
| | | | | 73/865.4 |
| 2014/0362091 | A1 | 12/2014 | Bouaziz et al. | |
| 2016/0094787 | A1 | 3/2016 | Govil et al. | |
| 2016/0320834 | A1 | 11/2016 | Lee et al. | |
| 2017/0053407 | A1 | 2/2017 | Benosman et al. | |
| 2018/0218203 | A1* | 8/2018 | Lawson | G06K 9/00348 |

OTHER PUBLICATIONS

Camunas-Mesa, L.A. et al., "On the use of orientation filters for 3D reconstruction in event-driven stereo vision," Frontiers in Neuroscience, vol. 8, Article 48, pp. 1-17 (Mar. 2014).

Ghosh, R. et al., "Real-Time Object Recognition and Orientation Estimation Using an Event-Based Camera and CNN," 2014 IEEE Biomedical Circuits and Systems Conference (BIOCAS) Proceedings, IEEE, pp. 544-547 (Oct. 2014).

Kim, H. et al., "Real-Time 3D Reconstruction and 6-DoF Tracking with an Event Camera," International Conference on Simulation, Modeling, ad Programming of Autonomous Robots (SIMPAR 2010), [Lecture Notes in Computer Science; Lect. Notes Computer], Springer International Publishing AG, B. Leibe et al. (Eds.): ECCV 2016, Part VI, LNCS 9910, pp. 349-364 (Sep. 2016).

Rebecq, H. et al., "EMVS: Event-Based Multi-View Stereo-3D Reconstruction with an Event Camera in Real-Time," International Journal of Compuer Vision, vol. 126, No. 12, pp. 1394-1414 (Nov. 2017).

Reverter Valeiras, D. et al., "An Asynchronous Neuromorphic Event-Driven Visual Part-Based Shape Tracking," IEEE Transactions on Neural Networks and Learning Systems, vol. 26, No. 12, pp. 3045-3059 (Dec. 2015).

Korean Intellectual Property Office, Notice of Preliminary Rejection (with English translation), Korean Patent Application No. 10-2020-7014546, 23 pages. dated Jan. 3, 2022.

European Patent Office, Examination Report, European Patent Application No. 18815416.5, 6 pages, dated Dec. 3, 2021.

* cited by examiner

DEFORMABLE OBJECT TRACKING

CROSS-REFERENCE TO RELATED APPLICATIONS

This application is a national stage filing of International Application No. PCT/US2018/060592 (International Publication No. WO 2019/099337), filed on Nov. 13, 2018, which claims priority to U.S. Provisional Patent Application No. 62/586,139, filed on Nov. 14, 2017, and U.S. Provisional Patent Application No. 62/623,784, filed on Jan. 30, 2018. The entire contents of each of these applications is incorporated by reference herein.

TECHNICAL FIELD

The present disclosure generally relates to object tracking, and in particular, to systems, methods, and devices for tracking deformable objects such as faces, hands, and other body parts using event camera data.

BACKGROUND

Existing object tracking systems use shutter-based camera images of objects to determine models of the object, such as three dimensional models of the objects. Existing object tracking systems often include a camera that transmits images of the objects to a processor that performs the tracking. Transmission of the images at a sufficient frame rate and resolution to enable tracking of deformable objects in real time often requires a communication link with substantial bandwidth. Using such a communication link increases heat generated and power consumption by the device.

SUMMARY

Various implementations disclosed herein include devices, systems, and methods that use event camera data to track deformable objects such as faces, hands, and other body parts. One exemplary implementation involves performing operations at a device with one or more processors and a computer-readable storage medium. The device receives a stream of pixel events output by an event camera. The event camera has pixel sensors positioned to receive light from a deformable object. Each respective pixel event is generated in response to a respective pixel sensor detecting a change in intensity (e.g., logarithmic (log) intensity) of the light at a respective event camera pixel that exceeds a comparator threshold. The device derives an image from the stream of pixel events by accumulating pixel events for multiple event camera pixels. The device tracks the deformable object using this data. Various implementations do so by generating a dynamic representation of the object and modifying the dynamic representation of the object in response to obtaining additional pixel events output by the event camera. In some implementations generating the dynamic representation of the object involves identifying features disposed on the deformable surface of the object using the stream of pixel events. The features are determined by identifying patterns of pixel events and the features are represented in the dynamic representation of the object. As new event stream data is received, the patterns of pixel events are recognized in the new data and used to modify the dynamic representation of the object. For example, a pattern of pixels identified for a feature at the tip of a person's nose can be identified and used to adjust the position of the person's nose in a dynamic representation of the person's face as the person's face changes.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
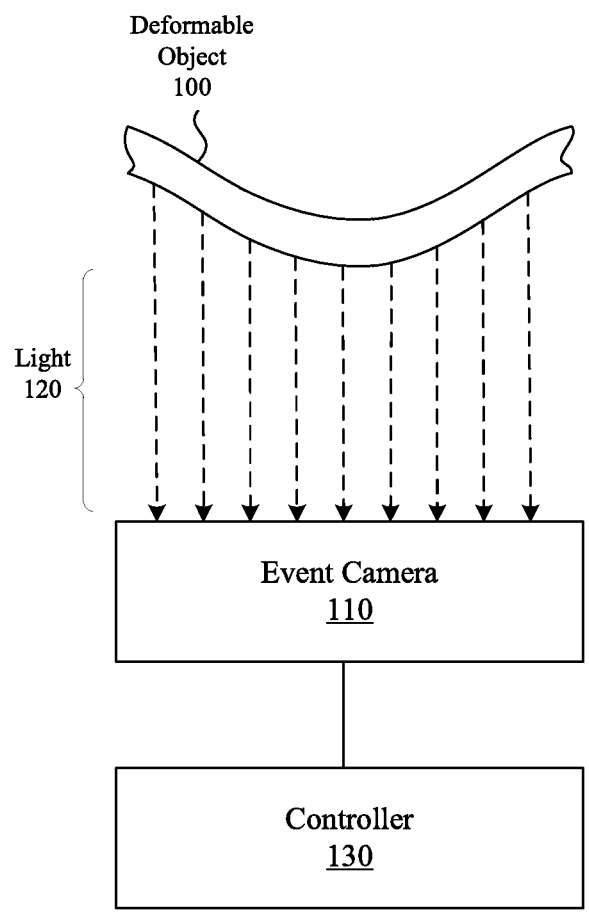
FIG. 1 is a block diagram of an example operating environment involving a single event camera in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, an object tracking system includes one or more cameras and a processor that performs deformable object tracking on data received from the camera (s) regarding light from a light source reflected off the object. In various implementations, the camera(s) include an event camera with a plurality of light sensors at a plurality of respective locations that, in response to a particular light sensor detecting a change in intensity (e.g., log intensity) of light, generates an event message indicating a particular location of the particular light sensor. An event camera may include or be referred to as a dynamic vision sensor (DVS), a silicon retina, a motion contrast camera, an event-based camera, or a frame-less camera. Thus, the event camera generates (and transmits) data regarding changes in (log) light intensity as opposed to a larger amount of data regarding absolute intensity at each light sensor. In some implementations the event camera(s) is/are configured to detect per-pixel changes in (log) light intensity at rates exceeding 1,000 events per second.

In various implementations, a tracking algorithm, potentially with an internal state, processes incoming events from the event camera(s) and produces a representation of the scene observed. The representation is updated dynamically as new events or groups of events are input to the algorithm. The dynamic object representation of the deformable object (s) in the scene can be used for various purposes. In one implementation, a display stage is used to visualize the observed scene or object. The display stage can display, for example, an object's appearance and dynamic behavior on a device. In another implementation, the dynamic object representation is transmitted to a remote participant for further processing, display, or storage. In another implementation, the dynamic representation is stored for future processing, display, or transmission.

FIG. 1 is a block diagram of an example operating environment involving an event camera 110 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 130 and an event camera 110.

In some implementations, the controller 130 includes a suitable combination of software, firmware, and/or hardware. The controller 130 is described in greater detail below with respect to FIG. 3. In some implementations, the controller 130 is a computing device that is local or remote relative to the deformable object 100. In one example, the controller 130 is a local server located within a scene in which the deformable object 100 is located. In another example, the controller 130 is a remote server located outside of the scene (e.g., a cloud server, central server, etc.). In some implementations, the controller 130 is communicatively coupled to the event camera 110 via one or more wired or wireless communication channels (e.g., BLUETOOTH, IEEE 802.11x, IEEE 802.16x, IEEE 802.3x, etc.). In some implementations, the functionalities of the controller 130 are provided by and/or combined with the event camera 110 in a single physical device.

In some implementations, the user wears the event camera 110 on his/her head or otherwise on a device worn or attached to the user's body. In some implementations, the event camera is part of a head mounted display (HMD) that is configured to present the AR/VR experience to the user. In other implementations, the event camera 110 is part of a handheld electronic device (e.g., a smartphone or a tablet) configured to present content to the user.

The event camera 110 is placed at a location relative to the deformable object 100 to capture light 120 from the deformable object 100. Non-limiting examples of the deformable object include, but are not limited to, a human face, a human hand, human hair, another human body part, an animal or other living organism, clothing, a sheet of paper, a magazine, a book, a machine or other man-made object having a surface that changes over time as a result of internal forces or its environment, and any other object that may exhibit deformation over time. Techniques disclosed herein can be used to track one or more objects in a scene and thus, in some implementations, can be used to track individual objects and in other implementations to track a 3D scene. The tracked information about an object or scene can be used for numerous purposes including, but not limited to, purposes that involve recording, mimicking, playing, or interpreting the deformation of the object or scene.

Figure 2:
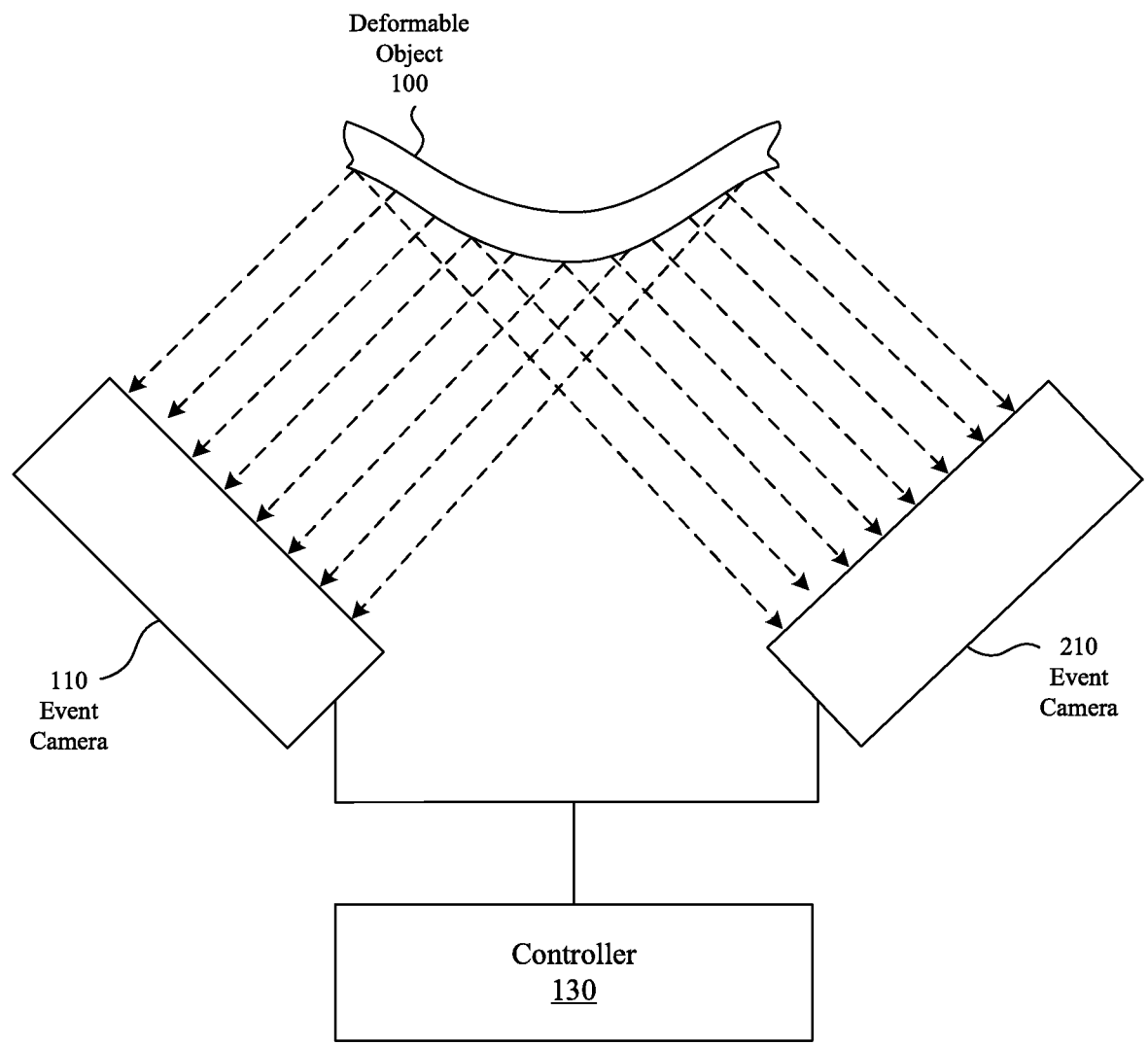
FIG. 2 is a block diagram of an example operating environment involving multiple event cameras in accordance with some implementations.
Figure 11:
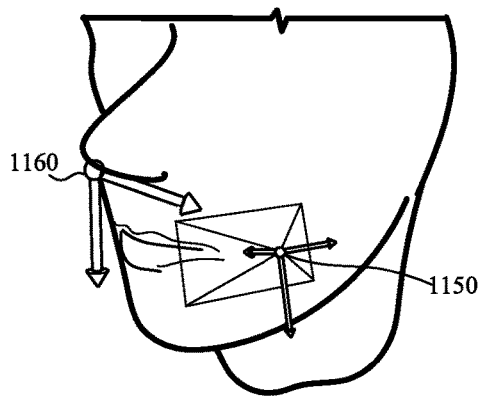
FIG. 11 illustrates possible event camera placements and orientations for a human face tracking application using two event cameras.
Figure 11:
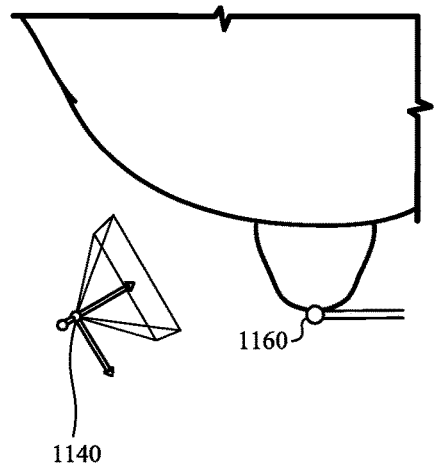

FIG. 2 is a block diagram of an example operating environment involving multiple event cameras 110, 120 in accordance with some implementations. In this example, the event cameras 110, 120 are positioned to capture events (e.g., log intensity changes at pixels) occurring at the deformable object 100 from different angles. The relative positions of the event cameras 110, 120 can be selected to capture information from different perspectives to enhance the appearance of the three dimensional model or other dynamic object representation that is generated over time. For example, if the deformable object 100 is a human face, event camera 110 can be positioned to capture a view of the face from a left side (e.g., 45 degree from perpendicular) and event camera 120 can be positioned to capture a view of the face from a right side (e.g., −45 degree from perpendicular). FIG. 11, discussed below, illustrates two event cameras that are positioned and oriented to track a human face.

In another implementation, multiple event camera are positioned at different locations on a flat surface of a mobile phone, tablet, or other device at a distance from one another (e.g., 2 inches, 3 inches, 4 inches, 5 inches, 10 inches, etc.). The distance from one another allows the different event cameras to capture views of a face or other deformable object from different relative positions. Using multiple event cameras 110, 120 to capture pixel events of a deformable object from different positions can enhance the appearance of a three dimensional model or other dynamic object representation that is generated over time.

Figure 3:
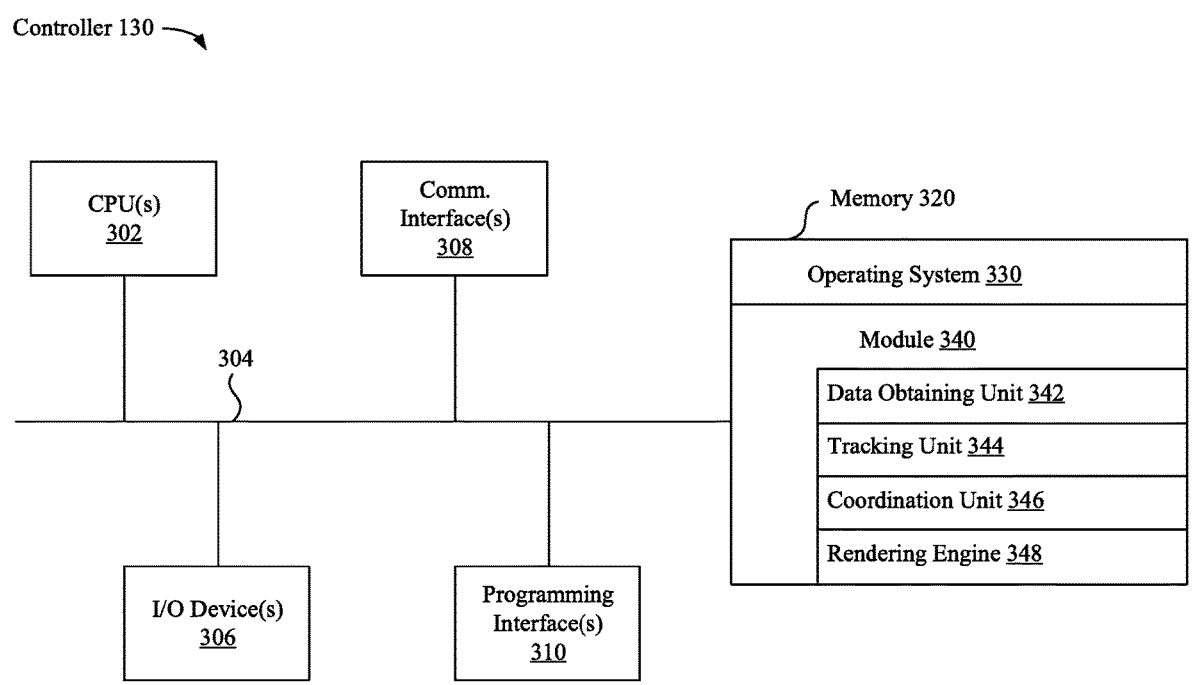
FIG. 3 is a block diagram of an example controller in accordance with some implementations.

FIG. 3 is a block diagram of an example of the controller 130 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 130 includes one or more processing units 302 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 306, one or more communication interfaces 308 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 310, a memory 320, and one or more communication buses 304 for interconnecting these and various other components.

In some implementations, the one or more communication buses 304 include circuitry that interconnects and controls communications between system components. In some implementations, the one or more I/O devices 306 include at least one of a keyboard, a mouse, a touchpad, a joystick, one or more microphones, one or more speakers, one or more image sensors, one or more displays, and/or the like.

The memory 320 includes high-speed random-access memory, such as dynamic random-access memory (DRAM), static random-access memory (SRAM), double-data-rate random-access memory (DDR RAM), or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a module 340.

The operating system 330 includes procedures for handling various basic system services and for performing hardware dependent tasks. In some implementations, the module 340 is configured to manage and coordinate one or more deformable object tracking experiences for one or more users. To that end, in various implementations, the module 340 includes a data obtaining unit 342, a tracking unit 344, a coordination unit 346, and a rendering unit 348.

In some implementations, the data obtaining unit 342 is configured to obtain data (e.g., presentation data, interaction data, sensor data, location data, etc.) from one or more event cameras 110, 120 and/or other devices. To that end, in various implementations, the data obtaining unit 342 includes instructions and/or logic therefor, and heuristics and metadata therefor.

In some implementations, the tracking unit 344 is configured to track a deformable object 100 using data from one or more event cameras 110, 120 and/or other devices. To that end, in various implementations, the tracking unit 344 includes instructions and/or logic therefor, and heuristics and metadata therefor.

In some implementations, the coordination unit 346 is configured to manage and coordinate the deformable object tracking experience to present, transmit, or store a dynamic object representation of a deformable object 110. To that end, in various implementations, the coordination unit 346 includes instructions and/or logic therefor, and heuristics and metadata therefor.

In some implementations, the rendering unit 348 is configured to render content for display, for example, based on a dynamic object representation of a deformable object 110. To that end, in various implementations, the rendering unit 348 includes instructions and/or logic therefor, and heuristics and metadata therefor.

Although the data obtaining unit 342, the tracking unit 344, the coordination unit 346, and the rendering unit 348 are shown as residing on a single device (e.g., the controller 130), it should be understood that in other implementations, any combination of the data obtaining unit 342, the tracking unit 344, the coordination unit 346, and the rendering unit 348 may be located in separate computing devices.

Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
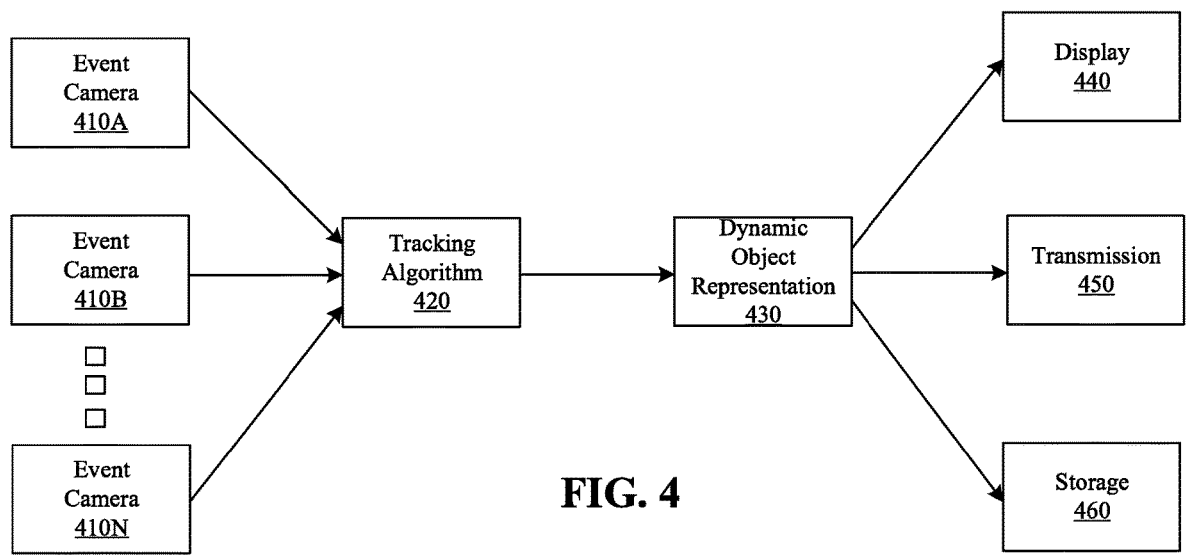
FIG. 4 illustrates a functional block diagram illustrating an event camera-based deformable object tracking process in accordance with some implementations.

FIG. 4 illustrates a functional block diagram illustrating an event camera-based deformable object tracking process 400 in accordance with some implementations. The process 400 includes a plurality of stages. At the first stage, the one or more event camera(s) 410A, 410B through 410N detect per-pixel changes in light intensity (e.g., log intensity) at high rates (e.g., at rates greater than 1000 events per second). The one or more event camera(s) 410A, 410B through 410N each comprise a plurality of light sensors at a plurality of respective locations. In response to a particular light sensor detecting a change in intensity of light (e.g., log intensity), an event camera generates an event message indicating a particular location of the particular light sensor. As described below with respect to FIG. 5, in various implementations, the particular location is indicated by a pixel coordinate. In various implementations, the event message further indicates a polarity of the change in intensity of light. In various implementations, the event message further indicates a time at which the change in intensity of light was detected. In various implementations, the event message further indicates a value indicative of the intensity of detected light.

The event camera data can be accumulated or otherwise combined. In some implementations the event camera data is combined to provide an intensity reconstruction image. In these implementations, an intensity reconstruction image generator (not shown) accumulates events over time to reconstruct/estimate absolute intensity values. As additional events are accumulated the intensity reconstruction image generator changes the corresponding values in the reconstruction image. In this way, it generates and maintains an updated image of values for all pixels of an image even though only some of the pixels may have received events recently. In various implementations, the intensity reconstruction image includes an image having a plurality of pixel values at a respective plurality of pixels corresponding to the respective locations of the light sensors. Upon receiving an event message indicating a particular location and a positive polarity (indicating that the intensity of light has increased), an amount (e.g., 1) is added to the pixel value at the pixel corresponding to the particular location. Similarly, upon receiving an event message indicating a particular location and a negative polarity (indicating that the intensity of light has decreased), the amount is subtracted from the pixel value at the pixel corresponding to the particular location. In various implementations, the intensity reconstruction image is filtered, e.g., blurred. In one implementation, the intensity reconstruction image is based on a positive timestamp image having a plurality of pixel values indicating when the corresponding light sensors triggered the last corresponding events with positive polarity. In one implementation, the intensity reconstruction image is based a negative timestamp image having a plurality of pixel values indicating when the corresponding light sensor triggered the last corresponding events with negative polarity. In one implementation, the intensity reconstruction image is based on a frequency image having a plurality of pixel values that measure the frequency of event messages received from the corresponding light sensors.

In some implementations the one or more event camera(s) 410A, 410B through 410N provide information that is used to produce accumulated event time information. In one implementation, a time stamp image generator (not shown) encodes information about the timing of events. In one example, time stamp image generator creates an image with values that represent a length of time since a respective pixel event was received for each pixel. In such an image, pixels having more recent events can have higher intensity values than pixels having less recent events.

At the second stage, a tracking algorithm 420 processes incoming events from the event camera(s) 410A, 410B through 410N to produce a representation of a deformable object. The representation is updated dynamically as new events are fed to the tracking algorithm 420. The tracking algorithm 420 thus produces and updates the dynamic object representation 430 of the deformable object. Optional stages that make use of the dynamic object representation 430 include a display stage 440 that enables visualizing the deformable object. For example, a rendering of the deformable object can be produced and updated based on the dynamic object representation 430. Another optional stage that makes use of the dynamic object representation 430 is a transmission stage 450 that involves transmitting the dynamic object representation 430 to a remote participant for further processing or storage. Yet another optional stage that makes use of the dynamic object representation 430 includes a storage stage 460 that stores the dynamic object representation 430 for future processing, display, or transmission.

Figure 5:
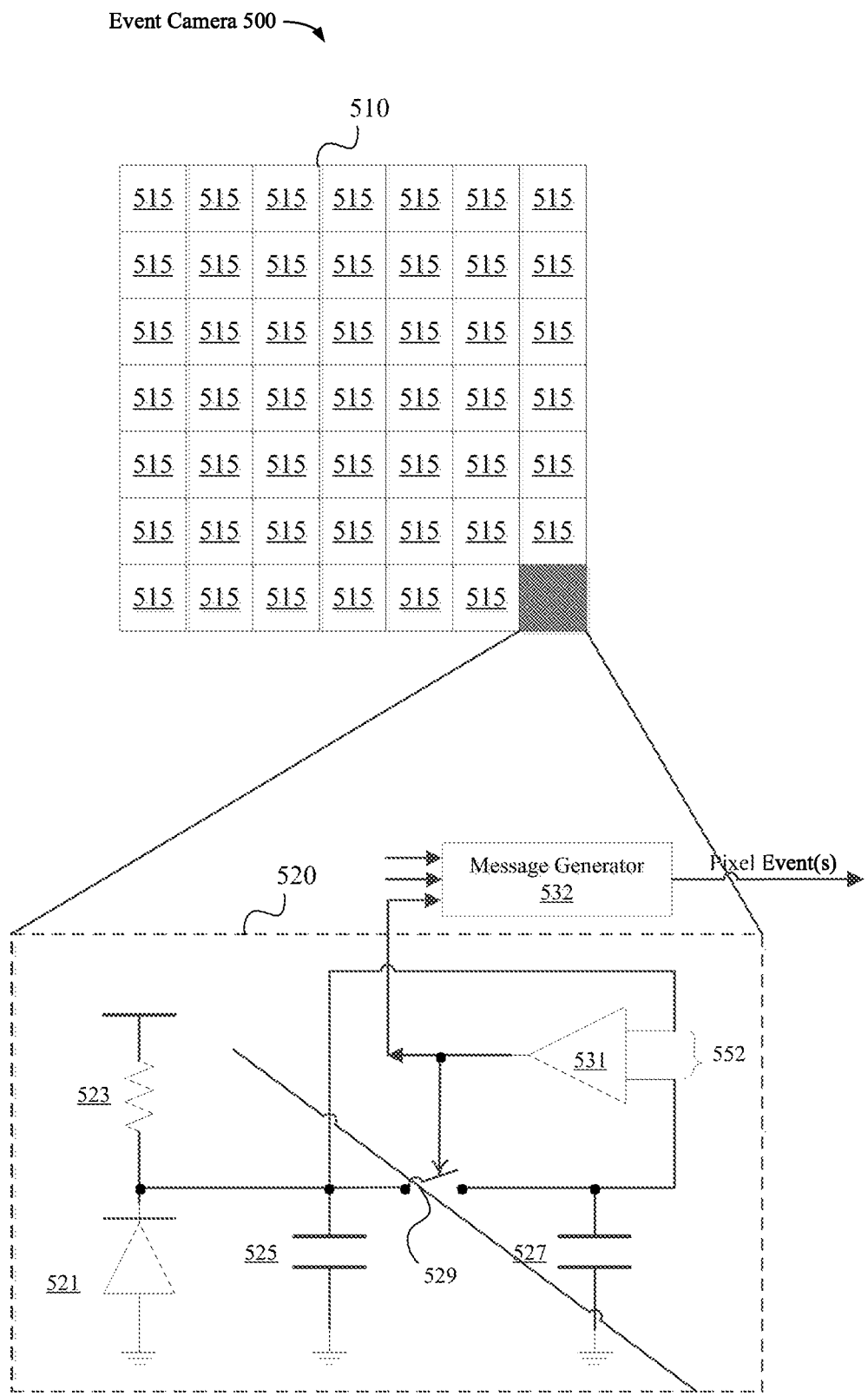
FIG. 5 illustrates a block diagram of an event camera in accordance with some implementations.

FIG. 5 illustrates a functional block diagram of an event camera 500 in accordance with some implementations. The event camera 500 includes a plurality of light sensors 515 respectively coupled to a message generator 532. In various implementations, the plurality of light sensors 515 are arranged in a matrix 510 of rows and columns and, thus, each of the plurality of light sensors 515 is associated with a row value and a column value.

Each of the plurality of light sensors 515 includes a light sensor 520. The light sensor 520 includes a photodiode 521 in series with a resistor 523 between a source voltage and a ground voltage. The voltage across the photodiode 521 is proportional to the intensity of light impinging on the light sensor 520. The light sensor 520 includes a first capacitor 525 in parallel with the photodiode 521. Accordingly, the voltage across the first capacitor 525 is the same as the voltage across the photodiode 521 (e.g., proportional to the intensity of light detected by the light sensor 520).

The light sensor 520 includes a switch 529 coupled between the first capacitor 525 and a second capacitor 527. The second capacitor 527 is coupled between the switch and the ground voltage. Accordingly, when the switch 529 is closed, the voltage across the second capacitor 527 is the same as the voltage across the first capacitor 525 (e.g., proportional to the intensity of light detected by the light sensor 520). When the switch 529 is open, the voltage across the second capacitor 527 is fixed at the voltage across the second capacitor 527 when the switch 529 was last closed.

The voltage across the first capacitor 525 and the voltage across the second capacitor 527 are fed to a comparator 531. When the absolute difference 552 between the voltage across the first capacitor 525 and the voltage across the second capacitor 527 is less than a threshold amount, the comparator 531 outputs a '0' voltage. When the voltage across the first capacitor 525 is higher than the voltage across the second capacitor 527 by at least the threshold amount, the comparator 531 outputs a '1' voltage. When the voltage across the first capacitor 525 is less than the voltage across the second capacitor 527 by at least the threshold amount, the comparator 531 outputs a '−1' voltage.

When the comparator 531 outputs a '1' voltage or a '−1' voltage, the switch 529 is closed and the message generator 532 receives this digital signal and generates a pixel event message.

As an example, at a first time, the intensity of light impinging on the light sensor 520 is a first light value. Accordingly, the voltage across the photodiode 521 is a first voltage value. Likewise, the voltage across the first capacitor 525 is the first voltage value. For this example, the voltage across the second capacitor 527 is also the first voltage value. Accordingly, the comparator 531 outputs a '0' voltage, the switch 529 remains closed, and the message generator 532 does nothing.

At a second time, the intensity of light impinging on the light sensor 520 increases to a second light value. Accordingly, the voltage across the photodiode 521 is a second voltage value (higher than the first voltage value). Likewise, the voltage across the first capacitor 525 is the second voltage value. Because the switch 529 is open, the voltage across the second capacitor 527 is still the first voltage value. Assuming that the second voltage value is at least the threshold value greater than the first voltage value, the comparator 531 outputs a '1' voltage, closing the switch 529, and the message generator 532 generates an event message based on the received digital signal.

With the switch 529 closed by the '1' voltage from the comparator 531, the voltage across the second capacitor 527 is changed from the first voltage value to the second voltage value. Thus, the comparator 531 outputs a '0' voltage, opening the switch 529.

At a third time, the intensity of light impinging on the light sensor 520 increases (again) to a third light value. Accordingly, the voltage across the photodiode 521 is a third voltage value (higher than the second voltage value). Likewise, the voltage across the first capacitor 525 is the third voltage value. Because the switch 529 is open, the voltage across the second capacitor 527 is still the second voltage value. Assuming that the third voltage value is at least the threshold value greater than the second voltage value, the comparator 531 outputs a '1' voltage, closing the switch 529, and the message generator 532 generates an event message based on the received digital signal.

With the switch 529 closed by the '1' voltage from the comparator 531, the voltage across the second capacitor 527 is changed from the second voltage value to the third voltage value. Thus, the comparator 531 outputs a '0' voltage, opening the switch 529.

At a fourth time, the intensity of light impinging on the light sensor 520 decreases back to second light value. Accordingly, the voltage across the photodiode 521 is the second voltage value (less than the third voltage value). Likewise, the voltage across the first capacitor 525 is the second voltage value. Because the switch 529 is open, the voltage across the second capacitor 527 is still the third voltage value. Thus, the comparator 531 outputs a '−1' voltage, closing the switch 529, and the message generator 532 generates an event message based on the received digital signal.

With the switch 529 closed by the '−1' voltage from the comparator 531, the voltage across the second capacitor 527 is changed from the third voltage value to the second voltage value. Thus, the comparator 531 outputs a '0' voltage, opening the switch 529.

The message generator 532 receives, at various times, digital signals from each of the plurality of light sensors 510 indicating an increase in the intensity (e.g., log intensity) of light ('1' voltage) or a decrease in the intensity of light ('−1' voltage). In response to receiving a digital signal from a particular light sensor of the plurality of light sensors 510, the message generator 532 generates a pixel event message.

In various implementations, each pixel event message indicates, in a location field, the particular location of the particular light sensor. In various implementations, the event message indicates the particular location with a pixel coordinate, such as a row value (e.g., in a row field) and a column value (e.g., in a column field). In various implementations, the event message further indicates, in a polarity field, the polarity of the change in intensity of light. For example, the event message may include a '1' in the polarity field to indicate an increase in the intensity of light and a '0' in the polarity field to indicate a decrease in the intensity of light. In various implementations, the event message further indicates, in a time field, a time the change in intensity in light was detected (e.g., a time the digital signal was received). In various implementations, the event message indicates, in an absolute intensity field (not shown), as an alternative to or in addition to the polarity, a value indicative of the intensity of detected light.

Figure 6:
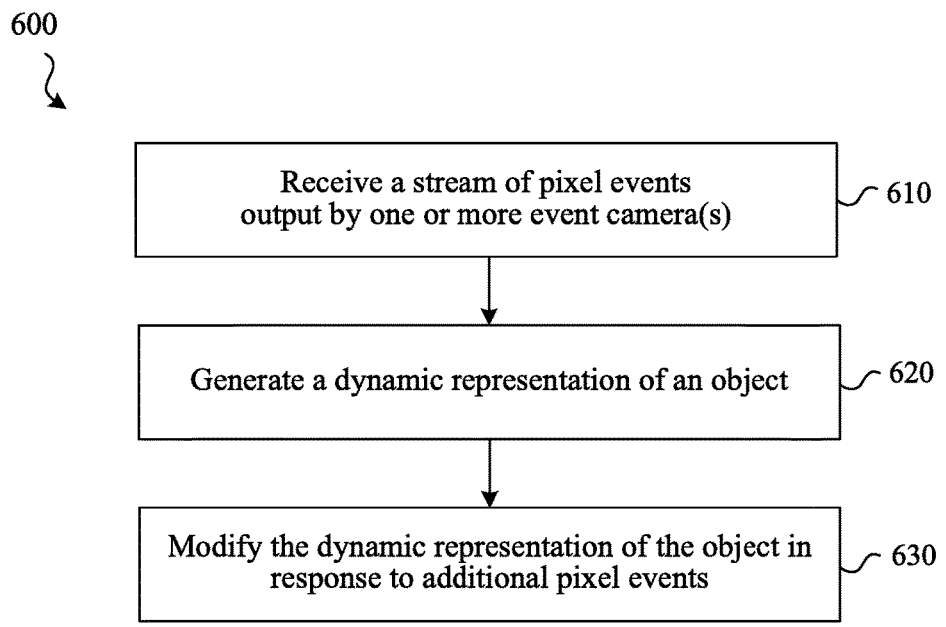
FIG. 6 is a flowchart representation of a method of event camera-based deformable object tracking in accordance with some implementations.

FIG. 6 is a flowchart representation of a method 600 of event camera-based deformable object tracking in accordance with some implementations. In some implementations, the method 600 is performed by a device (e.g., controller 130 of FIGS. 1-3), such as a mobile device, desktop, laptop, or server device. The method 600 can be performed on a device that has a screen for displaying 2D images and/or a screen for viewing stereoscopic images such as virtual reality (VR) display (e.g., a head-mounted display (HMD)) or an augmented reality (AR) display. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 receives a stream of pixel events output by one or more event camera(s). The pixel event data can be in various forms. The stream of pixel events can be received as a series of messages identifying pixel events at one or more pixels of the event camera(s). In various implementations, pixel event messages are received that each include a location field for the particular location of a particular light sensor, a polarity field, a time field, and/or an absolute intensity field.

As described with respect to FIG. 5 and known in the art, the one or more event camera(s) can each include a sensor, an assembly of lenses focusing incoming light onto the sensors, and a processing unit. The output of the event camera(s) can be a stream of events and/or compiled/filtered data regarding the pixel events. In one implementation, a pixel event includes a timestamp indicating the time (relative or absolute) at which an event occurred, a pixel location on the sensor at which the event occurred, and a polarity value indicating whether the event relates to an increase or a decrease in light intensity (e.g., log intensity) at the respective pixel of more than a certain threshold since the last event occurred (i.e., was identified) for the pixel. The geometric properties (e.g., the model of the optical path, i.e., determining how incoming light affects the pixels on the sensor) is comparable to frame-based cameras.

The object could be a human face, hand, or other human body party or any other object that may exhibit deformation over time. For example, FIG. 11, which is described below, illustrates two event cameras positioned relative to a human face to capture pixel events as the human face moves, changes, or otherwise deforms over time.

Returning to FIG. 6, at block 620, the method 600 generates a dynamic representation of an object in the scene using the stream of pixel events. In some implementations, the dynamic representation of the object is generated by identifying features disposed on the deformable surface of the object using the stream of pixel event. These features are represented in the dynamic representation of the object.

Various types of features and feature descriptors can be used. In some implementations, arbitrary feature descriptors are used. In one implementation, the descriptor simply contains event values. In other implementations, the descriptor contains spatial gradients of the event values, oriented gradients, histograms, etc. Some of these descriptors could be invariant to rotation and/or scale. In some implementations descriptors are determined having a particular format or using an existing technique, e.g., determined based on a scale-invariant feature transform (SIFT) that detects features, determined using a speeded up robust feature (SURF) feature detection technique, by determining a histogram of oriented gradients (HOG) technique, Distributed Aware Retinal Transform for Event-Based Cameras (DART), or any other appropriate technique.

Figure 7:
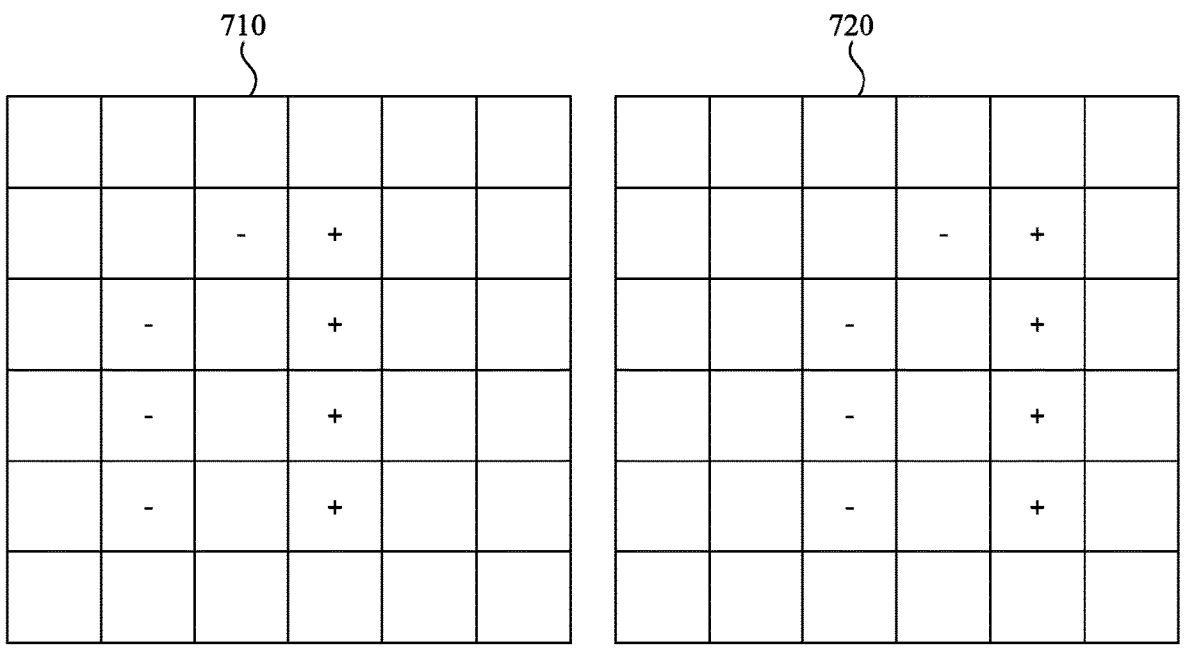
FIG. 7 illustrates a pattern of event camera data at different points in time in accordance with some implementations.

In some implementations, the features are identified by identifying patterns of pixel event corresponding to the features in the stream of pixel events. FIG. 7 illustrates pixel events captured for two different points in time (or short time periods). In this example, at a first time illustrated by representation 710, a pattern of plus/positive and minus/negative pixel events is identified. The plus/positive pixel events represent an increase in light intensity (e.g., log intensity) of more than a threshold value at a respective pixel and the minus/negative pixel events represent a decrease in light intensity of more than the threshold value at a respective pixel. At a second time illustrated by representation 720, the same pattern of plus/positive and minus/negative pixel events is identified with each respective event shifted one pixel to the right. The tracking algorithm used in various implementations identifies the same and similar patterns of pixel events to identify that a particular feature has moved. In this example, the pattern is identified to determine that the corresponding feature has moved to the right. A tolerance value can be used to identify a feature based on similarities of pixel event patterns. For example, the tracking algorithm can require a particular percentage of matching pixel events, e.g., 70% similarity, 80% similarity, 90% similarity, etc. Additionally, or alternatively, the tracking algorithm can require a number of successive movements of a pattern, e.g., recognizing the pattern at least 3 times, 4 times, 5 times, 10 times, 20 times, etc. within a timeframe, e.g., within 5 ms, 10 ms, 20 ms, 50 ms, etc. In other implementations in which more arbitrary feature descriptors are used, pixel events are not used to directly compare features. In those instances, the feature descriptors are compared using techniques that identify feature similarities and/or quantify amounts of similarity between features.

The event camera data that is used to generate the dynamic object representation can be accumulated over time or otherwise before being used to generate the dynamic object representation. In some implementations, the event camera data is accumulated into an image such an intensity reconstruction image, a timestamp image, or another image of values based on event camera data. In one implementation, event camera data is accumulated into a grid of cells representing a fixed number of events occurring within a predetermined time period (or otherwise temporarily accumulated) at corresponding pixel sensors of the event camera. In one implementation, the cells of a grid of cells correspond to particular pixel locations and accumulate values representing the number of events occurring at each such pixel location.

The dynamic representation of an object is generated by a tracking algorithm based on data from a stream of events from one or more event cameras. The tracking algorithm optionally uses information about the cameras, i.e., their locations and orientations in space, relative to a common coordinate system, camera intrinsics such as focal length and principal point, and/or a distortion model.

In some implementations, the tracking algorithm performs optical flow-based tracking. The tracking algorithm extracts features from the event stream and tracks the spatial locations of these features over time. This allows the tracking algorithm to track the two dimensional projections of actual points of the three dimensional object, as they are projected onto the pixels of the individual cameras. In one implementation, a sparse set of points, (e.g., representing a limited set of features) is tracked. A selection of which set of points to include in the sparse set of points can be based on various limitations or criteria. In one implementation, the sparse set of points is selected based on identifying points corresponding to a particular feature or features. In one implementation, the sparse set of data points is selected based on a quantitative threshold, e.g., identifying less than x points per y area. Tracking the set of points can involve tracking point locations (i.e., point tracks) or point movements (i.e., point flows) or both. The point tracks can have a lifetime (e.g., a start time and an end time for which the track is known) and tracks can be arbitrarily created or destroyed as the tracking algorithm receives more events from the event cameras. In another implementation, the tracking algorithm creates a dense flow field that provides the two dimensional trajectory over time for any/each two dimensional pixel position for any point in time.

In (optical) flow based tracking, the point tracks, point flows or dense flow field can optionally be processed further. In one implementation, for cameras with overlapping field of views, features are correlated and triangulated to effectively track three dimensional features over time. If a model for the object being tracking is used/known (e.g., for head tracking: a model for the appearance and/or dynamics of a generic human head or a model of the head of a particular human subject or group of subjects), the tracked features can be correlated with the model in order to compute a three dimensional representation of the object even in the absence of overlap between the cameras' fields of view.

Figure 8:
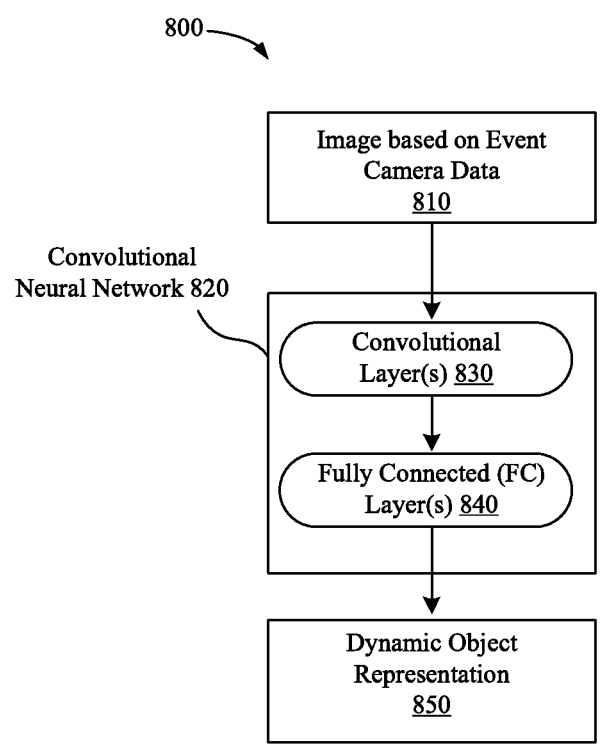
FIG. 8 is a functional block diagram illustrating a system using a convolutional neural network for tracking in accordance with some implementations.

In some implementations, the tracking algorithm performs machine-learning-based tracking. The event stream(s) of the event camera(s) are fed to a machine-learning algorithm. The algorithm either processes each event in turn, processes in batches of events, or events are accumulated spatially or temporally before they are fed to the machine learning algorithm, or a combination thereof. The machine learning algorithm can additionally take as input a set of values from a latent space, which potentially encodes information about the object being tracked and its previous states. In some implementations, the machine learning algorithm is trained to regress directly to a dynamic object representation, or to an intermediate representation that is later converted to the dynamic object representation. Optionally, the machine-learning algorithm can regress to an updated set of values in the latent space, that are then used to process future events. In some implementations, a machine learning algorithm that performs the tracking is configured as a convolutional neural network (CNN), a recurrent network such as a long short-term memory (LSTM) neural network, a spiking neural network (SNN), or a combination of these networks or using any other neural network architecture. FIG. 8 provides an example of a CNN configuration.

The dynamic representation of the object can have a variety of appropriate forms to suit the particular requirements of the implementation. In some implementations, the dynamic object representation is a two-dimensional mesh of a plurality of polygons that each approximate a respective portion of the deformable surface. In some implementations, the dynamic object representation is a depth-map representation comprising depth information defining distances between the object and at least a subset of the plurality of pixel sensors. In some implementations, the dynamic object representation is a plurality of regions that each define a local deformation of a corresponding portion of the deformable surface. In some implementations, the dynamic object representation is a set of three-dimensional (3D) points that define a 3D model of the object, each point in the set of 3D points representing a corresponding point on the deformable surface of the object. In some implementations, the dynamic object representation is a three-dimensional model of the object that is defined by the deformable surface as a set of arbitrary points. In other implementations, the dynamic object representation is an articulated model comprising rigid parts connected by joints, such as ball and socket joints, hinge joints, condyloid joints, pivot joints, gliding joints, or saddle joints.

Returning to FIG. 6, the object has a deformable surface that varies over time. The method comprises, at block 630, modifying the dynamic representation of the object in response to obtaining additional pixel events output by the event camera, e.g., to track the deformable surface of the object as it varies over time. In implementations in which features are identified based on pixel patterns, modifying the dynamic representation of the object can involve modifying locations of the features in the dynamic representation of the object based on identifying the patterns of pixel events corresponding to the features in the additional pixel events. Thus, as illustrated in FIG. 7, when a pixel pattern representing a feature is detected in a new location, the location of the feature in the dynamic object representation can be adjusted accordingly.

Generally, the tracking of features over time can involve tracking spatial locations of the features over time by tracking a sparse set of points. In circumstances of multiple event cameras, features can be identified and correlated amongst the data from the multiple cameras, e.g., the tip of the nose can be identified in data from multiple cameras. As additional event camera data from the event cameras is received the three dimensional (3D) location of the tip of the nose can be determined and adjusted in the dynamic object representation. In some implementations, modifying the dynamic representation of the object involves correlating the features in the stream of pixels with features of a three dimensional (3D) model of the object and computing a 3D representation of the object based on that correlating.

In some implementations, the method 600 further involves refining the dynamic representation of the object using camera-related data that characterizes aspects of the event camera. The camera-related data includes, as examples: extrinsic parameter information, intrinsic parameter information, correspondence information defining a relative location and orientation of the event camera with respect to a global reference frame, or a combination thereof.

FIG. 8 is a functional block diagram illustrating a system 800 using a convolutional neural network (CNN) 820 for tracking in accordance with some implementations. The system 800 operates on accumulated event data, such as a two-dimensional grid (i.e., input image(s) 810), such as an intensity reconstruction image or a timestamp image. In some implementations, each cell of such an input image 810 stores the N most recent events for the corresponding pixel. In another implementation, the CNN 820 additionally or alternatively takes as input an input image 810 in which the events have been integrated temporally per pixel. In another implementation, the CNN 820 takes as input a full-frame (conventional shutter-based) camera image.

The CNN 820 includes one or more convolutional layer(s) 830 and one or more fully connected layer(s) 840 and produces output, e.g., the dynamic object representation 850. The convolutional layer(s) 830 are configured to apply a convolution operation to their respective inputs and pass their results to the next layer. Before being processed by the next layer, the results (also referred to as activations) of the convolutions may be transformed by a non-linear function (also referred to as an activation function), such as a rectified linear unit (ReLU), the Hyperbolic tangent (TanH), or the Sigmoid function. Each convolution neuron in each of the convolution layer(s) 830 can be configured to process data for a receptive field, e.g., a portion of the resized input image(s) 810. The fully connected layer(s) 840 connect every neuron of one layer to every neuron of another layer. As discussed with respect to FIG. 6, the output of the CNN 850 can directly regress to a dynamic object representation or can regress to an intermediate representation from which a dynamic object representation is determined.

In some implementations, a stateful machine learning/neural network architecture is used. In some implementations, a CNN is configured to use a latent state. In one such implementation, the CNN is configured to regress to an intermediate representation and, additionally, to an update of the latent state. The resulting latent state is then used as an input to the fully-connected block in the next iteration. In another implementation, the neural network that is used is a long short-term memory (LSTM) or other recurrent network. In such implementations, the event data that is used as input may be provided as a labeled stream of sequential events. In some implementations, a recurrent neural network is configured to remember prior events and learn dynamic motions based on the history of events. A recurrent neural network can be configured to take individual events as input or batches of accumulated events.

Figure 9:
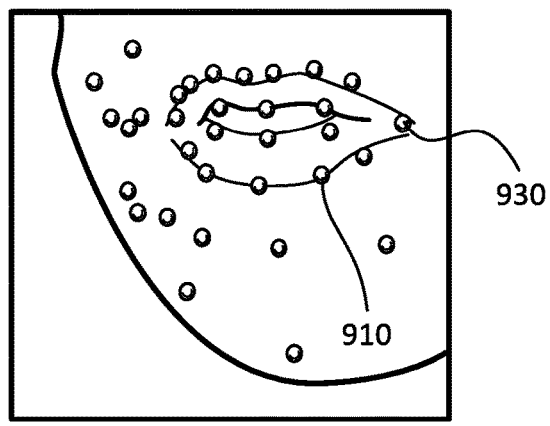
FIG. 9 illustrates a dynamic object representation of a deformable object at a first point in time in accordance with some implementations.
Figure 10:
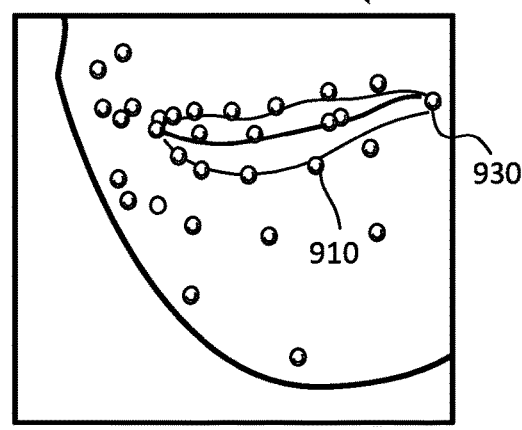
FIG. 10 illustrates a dynamic object representation of the deformable object of FIG. 9 at a second point in time in accordance with some implementations.

FIG. 9 illustrates a dynamic object representation of a deformable object (i.e., a human face) at a first point in time 900 in accordance with some implementations. In this example, a plurality of features are identified and illustrated with markers (e.g., marker 910, 920, 930). Note that only a few of the markers are labelled to avoid obscuring the content of the example. FIG. 10 illustrates a dynamic object representation of the deformable object (i.e., the human face) of FIG. 9 at a second point in time 1000 in accordance with some implementations. In this example, the surface of the human face has changed/deformed between FIGS. 9 and 10. For example, the mouth of the human face has closed and smiled. As a result the features at markers 910 and 930 have changed positions. In particular, the lip bottom feature identified by marker 910 has moved down relative to its position at the first point in time. Similarly, the lip corner identified by marker 930 has moved to the right in comparison to its position at the first point in time. Implementations track the positions of such features over time and adjust the dynamic object representation of the deformable object as it changes/deforms over time.

For the example of FIGS. 9 and 10 and other implementations discussed herein, the dynamic object representation of the deformable object is determined based on the locations of the tracked features. There are numerous options for the format and information included in the dynamic object representation. In one implementation, the dynamic object representation is a depth map representation, storing distance to the object being tracked for each pixel of the event camera sensor(s), or for a subset of the pixels. In another implementation, the dynamic object representation is a geometrical representation of the surface being tracked. For example, the geometric representation could be a triangle mesh. Such a representation could use either a mesh topology that changes over time or a fixed topology. In another implementation, the dynamic object representation is a lower-dimensional geometric representation of the surface of the object, such as a linear or non-linear combination of a pre-defined basis of meshes (for example, blendshapes or a principle component analysis (PCA) basis). In other implementations, the dynamic object representation is an articulated model comprising rigid parts and joints. In another implementation, the dynamic object representation is a localized geometric representation of the surface of the object. The surface can be split into regions and the representation configured to define the local deformation in each region. In another implementation, the dynamic object representation is a sparse or dense set of arbitrary three dimensional points on the surface of the object. In another implementation, the dynamic object representation includes two dimensional or three dimensional positions of points with pre-defined semantics, such as for example the mouth corners of a face, nose tip, etc., e.g., as illustrated in FIGS. 9 and 10. More generally, the dynamic object representation can include points corresponding to (a) geometric features (e.g., corners, creases, holes, tips) and/or to (b) textural features (e.g., patterns, artificial markers, salient features, colors intensity variations on the surface). In another implementation, the dynamic object representation is a set of two dimensional fields that represent the movement of pixels in each of the event cameras' views. In another implementation, the dynamic object representation is a higher-level semantic abstraction of the surface, for example in the case of a human face, values for muscle activations for a set of muscles that explain/correlate to the observed facial geometry.

FIG. 11 illustrates possible event camera placements and orientations for a human face tracking application using two event cameras. FIG. 11 illustrates three views 1100, 1110, 1120 illustrating the positions of a first event camera 1140 and a second event camera 1150 that are oriented to capture pixel events occurring as the human face changes or otherwise deforms. In this example, the two different event cameras 1140, 1150 each capture pixel events from different points of view. For example, as a feature 1160 at the tip of the nose of the human face changes (e.g., as the face moves, the nose wiggles, the nose rises, etc.) the event cameras 1140, 1150 capture pixel events from the different viewpoints. Each event camera tracks a different respective movement of the feature. Given the known locations of the event cameras to one another (e.g., in a reference coordinate space) and the pixel events, the three dimensional position and movement of the feature 1160 can be tracked over time.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A system comprising:
   an event camera comprising a two-dimensional (2D) array of pixel sensors;
   non-transitory computer-readable storage medium; and
   one or more processors communicatively coupled to the non-transitory computer-readable storage medium and the event camera, wherein the non-transitory computer-readable storage medium comprises program instructions that, when executed on the one or more processors, cause the system to perform operations, the operations comprising:
      receiving a stream of pixel events output by the event camera, the event camera comprising a plurality of pixel sensors positioned to receive light from a scene disposed within a field of view of the event camera, each respective pixel event generated in response to a respective pixel sensor detecting a change in light intensity that exceeds a comparator threshold;

identifying features disposed on a deformable surface of the object using the stream of pixel events; and generating a dynamic representation of the object, the dynamic representation comprising the features;

modifying the dynamic representation of the object in response to obtaining additional pixel events output by the event camera, wherein the dynamic representation of the object is a 3D representation having 3D portions that are modified to track deformation of a surface of the object varying over time; and outputting the dynamic representation of the object for further processing.

2. The system of claim 1, further comprising a second event camera, wherein modifying the dynamic representation of the object comprises:

identifying the features in the stream of pixel events from the event camera;

identifying the features in a second stream of pixel events from the second event camera; and tracking three dimensional (3D) locations of the features based on correlating the features identified from the stream of pixel events from the event camera and the features identified from the second stream of pixel events from the second event camera.

3. The system of claim 1, wherein identifying the features comprises:

identifying patterns of pixel events corresponding to the features in the stream of pixel events.

4. The system of claim 3, wherein modifying the dynamic representation of the object comprises:

modifying locations of the features in the dynamic representation of the object based on identifying the patterns of pixel events corresponding to the features in the additional pixel events;

tracking spatial locations of the features over time by tracking a sparse set of points or a dense flow field.

5. The system of claim 1, wherein generating and modifying of the dynamic representation of the object comprises:

correlating the features in the stream of pixels with features of a three dimensional (3D) model of the object, wherein the features correspond to portions of the surface of the object that are identified based on identifying patterns of pixel events corresponding to the features;

computing a 3D representation of the object based on the correlating;

tracking 3D locations of the features over time; and updating the 3D representation of the object to track the deformations of the surface of the object based on the tracking of the 3D locations of the features over time, wherein the 3D representation is deformed over time based on the deformations of the surface of the object over time.

6. The system of claim 1, wherein generating the dynamic representation of the object comprises using the stream of pixel events as input to a machine learning architecture, wherein generating the dynamic representation of the object comprises:

generating an input comprising accumulated event data from the stream of pixel events, the input comprising:

a grid of cells representing a fixed number of events occurring within a predetermined time period at corresponding pixel sensors of the event camera;

an image in which image pixels correspond to temporally-accumulated pixel events for corresponding pixels of the event camera;

an image in which image pixels correspond to amounts of time since pixel events were identified at corresponding pixel sensors of the event camera; or a full-frame shutter-based image of the object taken from a same location as the event camera or a known location relative to the event camera; and generating the dynamic representation via a convolutional neural network (CNN), wherein the input is input to the neural network.

7. The system of claim 6, wherein generating the dynamic representation of the object comprises:

generating an input comprising accumulated event data from the stream of pixel events; and generating the dynamic representation via a recurrent neural network, wherein the input is input to the neural network, wherein the recurrent neural network uses a latent state to track previous states of the object determined from previously-received event data.

8. The system of claim 1, wherein the dynamic representation of the object comprises:

a two-dimensional mesh of a plurality of polygons that each approximate a respective portion of the deformable surface;

a depth-map representation comprising depth information defining distances between the object and at least a subset of the plurality of pixel sensors;

a plurality of regions that each define a local deformation of a corresponding portion of the deformable surface;

a set of three-dimensional (3D) points that define a 3D model of the object, each point in the set of 3D points representing a corresponding point on the deformable surface of the object;

a three-dimensional model of the object that is defined by the deformable surface as a set of arbitrary points; or an articulated model comprising rigid parts connected by joints.

9. The system of claim 1, wherein the further processing comprises:

storing the dynamic representation in a non-volatile storage medium, transmitting the dynamic representation to a remote computing device via a network adapter, or rendering the dynamic representation to create a visualization.

10. The system of claim 1, wherein the dynamic representation comprises a set of three-dimensional (3D) points that define a 3D model of the object, each point in the set of 3D points representing a corresponding point on the surface of the object.

11. The system of claim 1, wherein the dynamic representation comprises a 3D model of the object that is defined by the deformable surface as a set of arbitrary points.

12. The system of claim 1, wherein the dynamic representation is an articulated 3D model comprising rigid parts connected by joints.

13. The system of claim 1, wherein the 3D portions of the 3D representation are modified to track the deformation based on tracking a sparse set of points, wherein a quantitative threshold limits the sparse set of points to be less than a number of points tracked per fixed size area.

14. The system of claim 1, wherein the 3D portions of the 3D representation are modified to track the deformation based on matching a pattern of plus and minus pixel events.

15. The system of claim 1, wherein the 3D portions of the 3D representation are modified to track the deformation based on matching a pattern of pixel events using a matching threshold.

16. The system of claim 1, wherein the 3D portions of the 3D representation are modified to track the deformation based on matching a pattern of plus and minus pixel events using a matching threshold.

17. The system of claim 1, wherein the 3D portions of the 3D representation are modified to track the deformation based on a tracking algorithm that requires at least a threshold number of successive movements of a pattern of pixel events.

18. The system of claim 1, wherein the dynamic representation is generated by identifying features on the surface of the object having feature descriptors that comprise spatial gradients of the event values, oriented gradients, or histograms.

19. A method for deformable object tracking, the method comprising:
at a device with one or more processors and a non-transitory computer-readable storage medium:
receiving a stream of pixel events output by an event camera, the event camera comprising a plurality of pixel sensors positioned to receive light from a scene disposed within a field of view of the event camera, each respective pixel event generated in response to a respective pixel sensor detecting a change in light intensity that exceeds a comparator threshold;
generating a dynamic representation of an object in the scene using the stream of pixel events, the object having a deformable surface that varies over time; and
modifying the dynamic representation of the object in response to obtaining additional pixel events output by the event camera, wherein the dynamic representation of the object is a 3D representation having 3D portions that are modified to track deformation of a surface of the object varying over time.

20. The method of claim 19, wherein generating the dynamic representation of the object comprises:
identifying features disposed on the deformable surface of the object using the stream of pixel events, wherein identifying the features comprises:
identifying patterns of pixel events corresponding to the features in the stream of pixel events; and
representing the features in the dynamic representation of the object.

21. The method of claim 20, wherein modifying the dynamic representation of the object comprises:
modifying locations of the features in the dynamic representation of the object based on identifying the patterns of pixel events corresponding to the features in the additional pixel events; or
tracking spatial locations of the features over time by tracking a sparse set of points.

22. The method of claim 20, wherein modifying the dynamic representation of the object comprises:
tracking spatial locations of the features over time by tracking a dense flow field.

23. The method of claim 20, wherein modifying the dynamic representation of the object comprises:
identifying the features in streams of pixel events from multiple event cameras; and
tracking three dimensional (3D) locations of the features based on correlating the features in the streams of pixels of the multiple event cameras.

24. The method of claim 20, wherein modifying the dynamic representation of the object comprises:
correlating the features in the stream of pixels with features of a three dimensional (3D) model of the object; and
computing a 3D representation of the object based on the correlating.

25. The method of claim 19, wherein generating the dynamic representation of the object comprises using the stream of pixel events as input to a machine learning architecture.

26. The method of claim 19, wherein generating the dynamic representation of the object comprises:
generating an input comprising accumulated event data from the stream of pixel events, the input comprising a grid of cells representing a fixed number of events occurring within a predetermined time period at corresponding pixel sensors of the event camera; and
generating the dynamic representation via a convolutional neural network (CNN), wherein the input is input to the neural network.

27. The method of claim 19, wherein generating the dynamic representation of the object comprises:
generating an input comprising accumulated event data from the stream of pixel events, the input comprising an image in which image pixels correspond to temporally-accumulated pixel events for corresponding pixels of the event camera; and
generating the dynamic representation via a convolutional neural network (CNN), wherein the input is input to the neural network.

28. The method of claim 19, wherein generating the dynamic representation of the object comprises:
generating an input comprising accumulated event data from the stream of pixel events, the input comprising an image in which image pixels correspond to amounts of time since pixel events were identified at corresponding pixel sensors of the event camera; and
generating the dynamic representation via a convolutional neural network (CNN), wherein the input is input to the neural network.

29. A non-transitory computer-readable storage medium, storing program instructions computer-executable on a computer to perform operations comprising:
receiving a stream of pixel events output by the event camera, the event camera comprising a plurality of pixel sensors positioned to receive light from a scene disposed within a field of view of the event camera, each respective pixel event generated in response to a respective pixel sensor detecting a change in light intensity that exceeds a comparator threshold;
generating a dynamic representation of an object in the scene using the stream of pixel events, the object having a deformable surface that varies over time;
tracking features of the object over time based on the stream of pixel events; and
modifying the dynamic representation of the object in response to the tracking of the features of the object over time, wherein the dynamic representation of the object is a 3D representation having 3D portions that are to track deformation of a surface of the object varying over time.

* * * * *

UNITED STATES PATENT AND TRADEMARK OFFICE
CERTIFICATE OF CORRECTION

PATENT NO. : 11,379,996 B2
APPLICATION NO. : 16/761582
DATED : July 5, 2022
INVENTOR(S) : Peter Kaufmann et al.

It is certified that error appears in the above-identified patent and that said Letters Patent is hereby corrected as shown below:

In the Claims

Column 20, Line 64 reads:
". . . are to track deformation of a surface of the object . . ."

Should read:
-- … are modified to track deformation of a surface of the object . . . --

Signed and Sealed this
Twenty-third Day of August, 2022

Katherine Kelly Vidal
*Director of the United States Patent and Trademark Office*